United States Patent
Christensen et al.

(10) Patent No.: US 10,836,397 B1
(45) Date of Patent: Nov. 17, 2020

(54) SYSTEM AND METHOD FOR INCREASING CATALYST TEMPERATURE

(71) Applicant: Ford Global Technologies, LLC, Dearborn, MI (US)

(72) Inventors: M. Scott Christensen, Canton, MI (US); Adam Joseph Krach, Canton, MI (US); Michael Bastanipour, Ferndale, MI (US); Nicholas Herhusky, Dearborn, MI (US); Alexander O'Connor Gibson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/503,369

(22) Filed: Jul. 3, 2019

(51) Int. Cl.
| | | |
|---|---|---|
| *B60W 30/192* | (2012.01) | |
| *F16H 61/02* | (2006.01) | |
| *B60W 10/06* | (2006.01) | |
| *B60W 10/115* | (2012.01) | |
| *B60W 10/196* | (2012.01) | |
| *F02P 5/15* | (2006.01) | |
| *F16H 59/78* | (2006.01) | |
| *F16H 59/72* | (2006.01) | |

(52) U.S. Cl.
CPC .......... *B60W 30/192* (2013.01); *B60W 10/06* (2013.01); *B60W 10/115* (2013.01); *B60W 10/196* (2013.01); *F02P 5/1502* (2013.01); *F16H 61/0213* (2013.01); *B60W 2510/0676* (2013.01); *B60W 2510/1005* (2013.01); *B60W 2510/107* (2013.01); *B60W 2710/06* (2013.01); *B60W 2710/1005* (2013.01); *B60W 2710/188* (2013.01); *F16H 59/72* (2013.01); *F16H 59/78* (2013.01); *F16H 2061/0232* (2013.01)

(58) Field of Classification Search
CPC .... B60W 10/06; B60W 10/11; B60W 10/115; B60W 30/192; B60W 30/194; B60W 2510/0676; B60W 2510/107; B60W 2710/1005; B60W 2710/1072; F16H 61/0213; F16H 59/72; F16H 59/78; F16H 2061/0232
See application file for complete search history.

(56) References Cited

U.S. PATENT DOCUMENTS

| | | | |
|---|---|---|---|
| 4,875,391 A | 10/1989 | Leising et al. | |
| 5,345,843 A * | 9/1994 | Fujita | F16H 59/72 477/98 |
| 10,024,394 B2 | 7/2018 | Long et al. | |
| 2016/0084375 A1 * | 3/2016 | Yoon | F16H 61/688 701/55 |
| 2018/0003287 A1 * | 1/2018 | Aoki | F16H 57/04 |
| 2018/0335133 A1 | 11/2018 | Webert et al. | |
| 2020/0055520 A1 * | 2/2020 | Glockner | B60W 10/06 |

* cited by examiner

*Primary Examiner* — Edwin A Young
(74) *Attorney, Agent, or Firm* — Geoffrey Brumbaugh; McCoy Russell LLP

(57) ABSTRACT

Systems and methods for operating an engine and a transmission to reduce a catalyst light off time are disclosed. In one example, clutches of a transmission are operated to provide a desired load to the engine so that engine combustion stability may be improved while supplying heat to a catalyst so that the catalyst light off time may be reduced.

20 Claims, 5 Drawing Sheets

SYSTEM AND METHOD FOR INCREASING CATALYST TEMPERATURE

FIELD

The present description relates to systems and method for operating a transmission to increase a temperature of a catalyst. The system and methods may be suitable for powertrains that include automatic transmissions.

BACKGROUND AND SUMMARY

An engine of a vehicle may be started at temperatures that are lower than 20° C. Starting the engine during such conditions may be referred to as cold starting the engine. A catalyst that is in the engine's exhaust system may operate with a low efficiency when its temperature is less than 200° C. Further, it may be difficult for the engine to operate with a very lean air-fuel ratio when the engine temperature is low due to poor combustion stability. Consequently, larger than desired amounts of emissions produced by the engine (e.g., hydrocarbons and carbon monoxide) at lower engine temperatures may be exhausted to the atmosphere. One way to improve catalyst efficiency at low engine and catalyst temperatures is to increase engine exhaust temperatures via retarding engine spark timing. However, even with retarded engine spark timing, engine emissions may be greater than may be desired. Further, the engine combustion stability may degrade by operating the engine with retarded spark timing when engine load is low. Therefore, it may be desirable to provide a way of increasing catalyst temperature without degrading engine combustion stability.

The inventors herein have recognized the above-mentioned issues and have developed a vehicle operating method, comprising: locking two transmission clutches and adjusting a torque capacity of a third transmission clutch via a controller in response to an engine cold start request; and starting an engine and retarding spark timing of the engine from a minimum spark timing for best engine torque spark timing via the controller in response to the engine cold start request.

By locking two transmission clutches and adjusting a torque carrying capacity of a third transmission clutch, it may be possible to provide the technical result of reducing catalyst light off time so that engine emissions may be converted sooner after an engine start, thereby lowering vehicle emissions. Specifically, a load that is applied to an engine by a transmission may be adjusted by fully closing or locking one or more transmission clutches while a torque capacity of one transmission clutch is adjusted to supply the load to the engine. The load may be adjusted as a function of an actual total number of engine combustion events since a most recent engine start, engine temperature, transmission temperature, and other vehicle operating conditions. By applying a load to the engine that is greater than a load that is applied to the engine due to rotating a torque converter of a transmission, it may be possible to increase the mass flow rate through the engine and improve engine combustion stability, thereby reducing vehicle emissions.

The present description may provide several advantages. In particular, the approach may reduce vehicle emissions. Further, the approach may improve engine combustion stability when spark retard is applied to an engine. Further still, the approach may be applied in a way that reduces transmission clutch degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
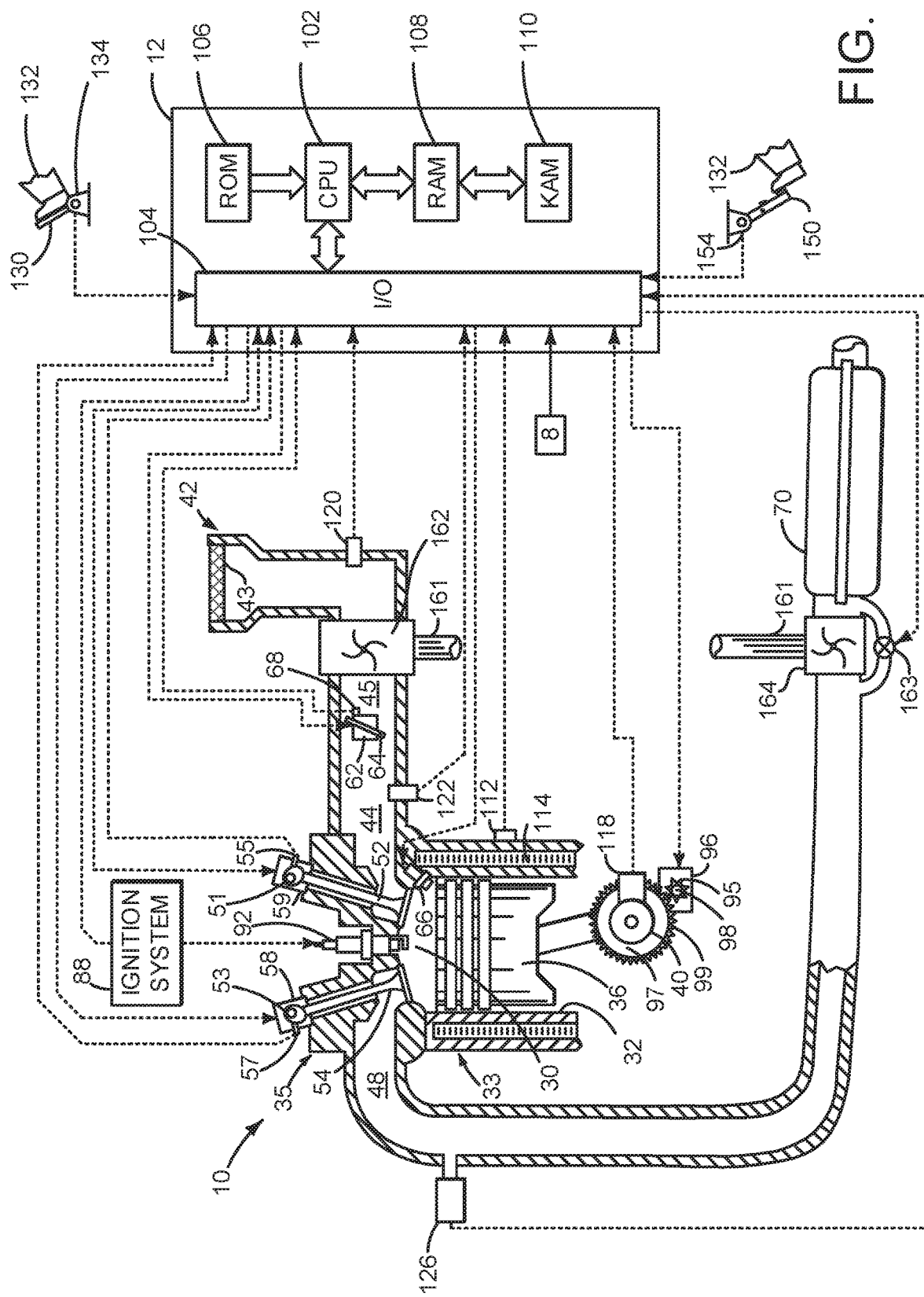
FIG. 1 is a schematic diagram of an engine.
Figure 2:
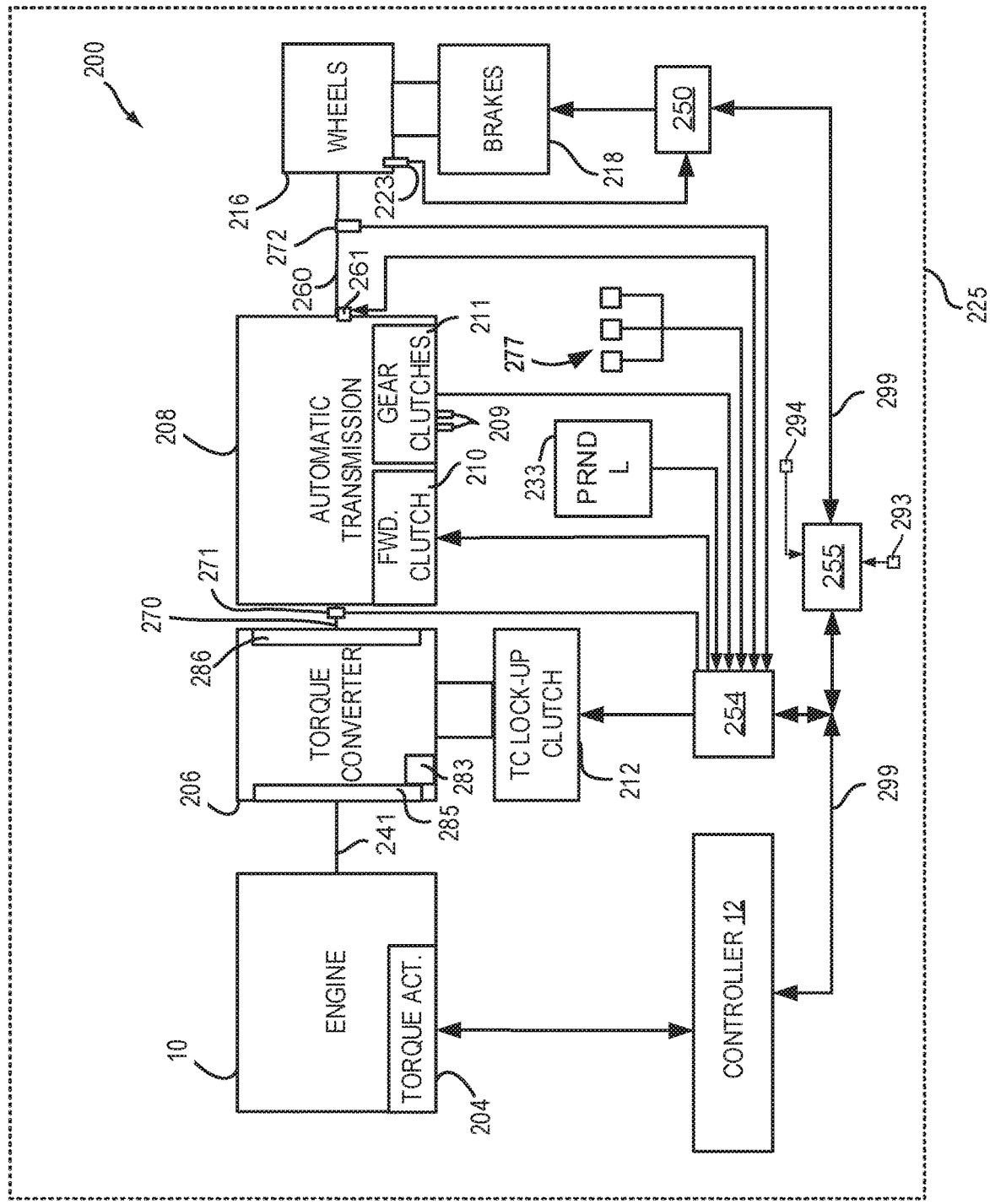
FIG. 2 is a schematic diagram of a vehicle driveline including a step ratio transmission.
Figure 3:
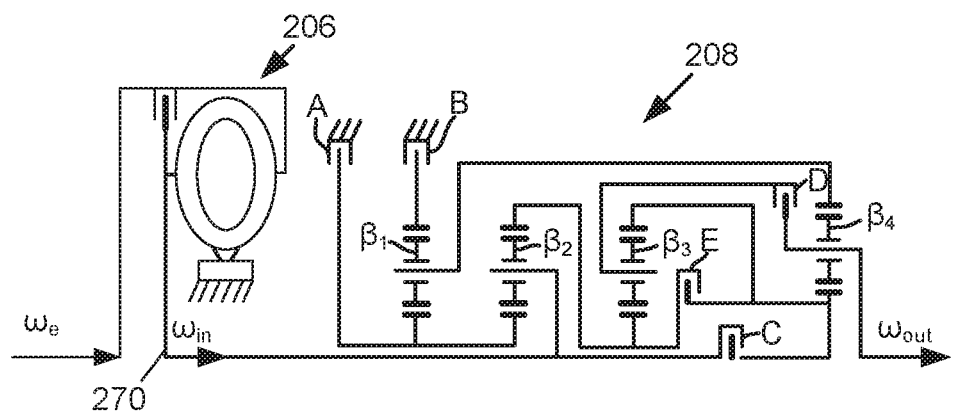
FIGS. 3 and 4 shows example transmission torque paths for a step ratio transmission.
Figure 4:
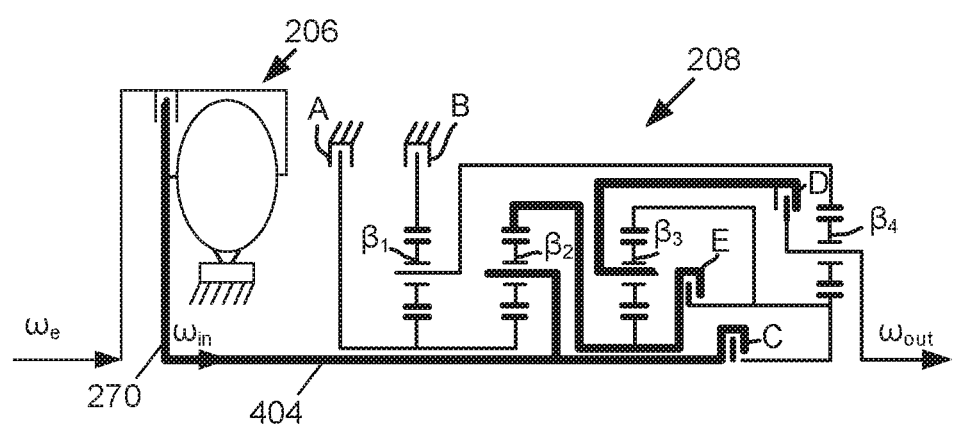

The present description is related to controlling an engine and a transmission of a driveline. The driveline may include an internal combustion engine as shown in FIG. 1. The internal combustion engine may be included in a driveline or powertrain of a vehicle as shown in FIG. 2. The transmission may include planetary gear sets as shown in FIGS. 3 and 4. The engine and transmission may be operated according to the method of FIG. 6 to provide the sequences shown in FIG. 5.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake camshaft 51 and an exhaust camshaft 53. The position of intake camshaft 51 may be determined by intake camshaft sensor 55. The position of exhaust camshaft 53 may be determined by exhaust camshaft sensor 57. Intake valves may be held open or closed over an entire engine cycle as the engine rotates via deactivating intake valve actuator 59, which may electrically, hydraulically, or mechanically operate intake valves. Alternatively, intake valves may be opened and closed during a cycle of the engine. Exhaust valves may be held open or closed over an entire engine cycle (e.g., two engine revolutions) as the engine rotates via deactivating exhaust valve actuator 58, which may be electrically, hydraulically, or mechanically operate exhaust valves. Alternatively, exhaust valves may be opened and closed during a cycle of the engine.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Alternatively, compressor 162 may be electrically powered. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

A vehicle and/or engine operating mode may be selected via a human driver via human/machine interface 8. Human/machine interface may be comprised of a switch, touch screen, or other input device. The vehicle operating mode (e.g., sport or touring) may be activated via the human/machine interface 8.

Controller 12 is shown in FIG. 1 as a conventional microcomputer including: microprocessor unit 102, input/output ports 104, read-only memory 106 (e.g., non-transitory memory), random access memory 108 (e.g., transitory memory), keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a braking torque from brake controller 250.

In other examples, the partitioning of controlling powertrain devices may be partitioned differently than is shown in FIG. 2. For example, a single controller may take the place of vehicle system controller 255, engine controller 12, transmission controller 254, and brake controller 250. Alternatively, the vehicle system controller 255 and the engine controller 12 may be a single unit while the transmission controller 254 and the brake controller 250 are standalone controllers. In this example, powertrain 200 may be powered by engine 10. Engine 10 may be started with an engine starting system shown in FIG. 1. Further, torque of engine 10 may be adjusted via torque actuator 204, such as a fuel injector, throttle, etc. An engine output torque may be transmitted to torque converter 206. Torque converter 206 includes a turbine 286 to output torque to input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request. Torque converter 206 also includes pump 283 that pressurizes fluid to operate gear clutches 211. Pump 283 is driven via impeller 285, which rotates at a same speed as engine 10.

Automatic transmission 208 includes gear clutches (e.g., gears 1-10) 211 and forward clutch 210. Automatic transmission 208 is a fixed step ratio transmission. Alternatively, transmission 208 may be a continuously variable transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Parking pawl 261 may selectively engage output shaft 260 to lock output shaft 260 in a fixed position, thereby restricting vehicle motion. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller 254 also selectively deactivates or disengages TCC 212, gear clutches 211, and forward clutch 210. Transmission controller 254 receives input from gear or range selector 233. The transmission gear or range selector may be placed in park (P), reverse (R), neutral (N), drive (D), or low (L) and the transmission controller 254 may engage one or more gears responsive to the position of gear or range selector 233.

Further, a frictional force may be applied to wheels 216 by engaging friction wheel brakes 218. In one example, friction wheel brakes 218 may be engaged in response to the driver pressing his/her foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his/her foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then commands engine 10 in response to the driver demand torque. Vehicle system controller 255 requests the engine torque from engine controller 12. If engine torque is less than a transmission input torque limit (e.g., a threshold value not to be exceeded), the torque is delivered to torque converter 206, which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed.

Accordingly, torque control of the various powertrain components may be supervised by vehicle system controller 255 with local torque control for the engine 10, transmission 208, and brakes 218 provided via engine controller 12, electric machine controller 252, transmission controller 254, and brake controller 250. Vehicle system controller may also determine road grade via inclinometer 293 and vehicle mass via vehicle suspension height sensor 294.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), and ambient temperature sensors.

Brake controller 250 receives wheel speed information via wheel speed sensor 223 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255.

Referring now to FIG. 3, a stick diagram of torque converter 206 and step ratio transmission 208 of FIG. 2 is shown. In this example, transmission 208 is an eight speed transmission; however, it should be appreciated that the present disclosure is not limited this transmission configuration. Engine speed We is input to torque converter 206 and the output speed of the torque converter, or transmission inputs shaft speed is shown as $\omega_{in}$. The transmission output shaft speed is indicated as $\omega_{out}$. The transmission clutches 211 of FIG. 2 are individual shown as clutches A-E. A plurality of planetary gear sets are shown as indicated at $\beta_1$-$\beta_4$. Each of planetary gear sets has a gear ratio. For example, $\beta_1$=2.0, $\beta_2$=2.0, $\beta 3$=1.61, and $\beta 4$=3.696. Clutches A and B ground planetary gear sets to the vehicle chassis when they are fully closed. The transmission shown in FIG. 2 may be operated according to the following clutch table:

TABLE 1

| Gear | A | B | C | D | E |
|------|---|---|---|---|---|
| 1 | X | X | X | | |
| 2 | X | X | | | X |
| 3 | | X | X | | X |
| 4 | | X | | X | X |
| 5 | | X | X | X | |
| 6 | | | X | X | X |
| 7 | X | | X | X | |
| 8 | X | | | X | X |
| R | X | X | | X | |

The letters A-E indicate the transmission's clutches and the gear numbers are numerically indicated along the left most column. The X's indicate which clutches are closed to engage the respective gears 1-8.

Referring now to FIG. 4, a stick diagram of torque converter 206 and step ratio transmission 208 of FIG. 2 with clutches A and B locked is shown. As discussed in the description of FIG. 3, engine speed We is input to torque converter 206 and the output speed of the torque converter, or transmission inputs shaft speed is shown as $\omega_{in}$. The thick line 404 shows the path for engine torque when only clutches A and B are fully locked. The shafts and gears associated with the path 404 rotate freely when only clutches A and B are fully locked (e.g., zero or less than a threshold amount of slip across the clutch). Thus, it may be observed that locking clutches A and B allows a portion of transmission components to rotate freely. Further, if clutch C is applied, then clutch C applies a torque directly to the transmission input shaft 270 via grounding one side of clutch C to the chassis. Note that there is no mechanical advantage between clutch C and transmission input shaft 270 in this example. In other words, the torque capacity (e.g., amount of torque that the clutch may transfer from one side of the clutch to the other side of the clutch) of clutch C is applied to the transmission and engine if the torque converter clutch is locked. For example, if the torque converter clutch is locked and the torque capacity of clutch C is adjusted to 100 Newton-meters, 100 Newton-meters of torque will resist engine 10. If clutch E is applied, the clutch capacity of clutch E multiplied by a ratio of ($\beta_2$+1)/$\beta_2$ is applied to the transmission input shaft and the engine via planetary gear set $\beta_2$. If clutch D is applied, the clutch capacity of clutch D multiplied by a ratio of ((($\beta_2$+1)·(($\beta_3$+1))/$\beta_2$ is applied to the transmission input shaft and the engine via planetary gear set $\beta_2$ and $\beta_3$.

Thus, the system of FIGS. 1-4 provides for a system, comprising: an engine; an automatic transmission coupled to the engine; and a controller including executable instructions stored in non-transitory memory to engage a parking pawl of the automatic transmission, fully close two clutches of the automatic transmission, and adjust a torque capacity of a third clutch in response to a request to heat a fluid of the automatic transmission. The system includes where the third clutch is a different clutch for each engine start. The system further comprises additional executable instructions to select the third clutch in response to a clutch degradation metric. The system further comprises additional executable instructions to select the third clutch in response to a temperature. The system includes where the temperature is an engine temperature or a transmission temperature. The system further comprises additional executable instructions to select the third clutch from a plurality of clutches.

Figure 5:
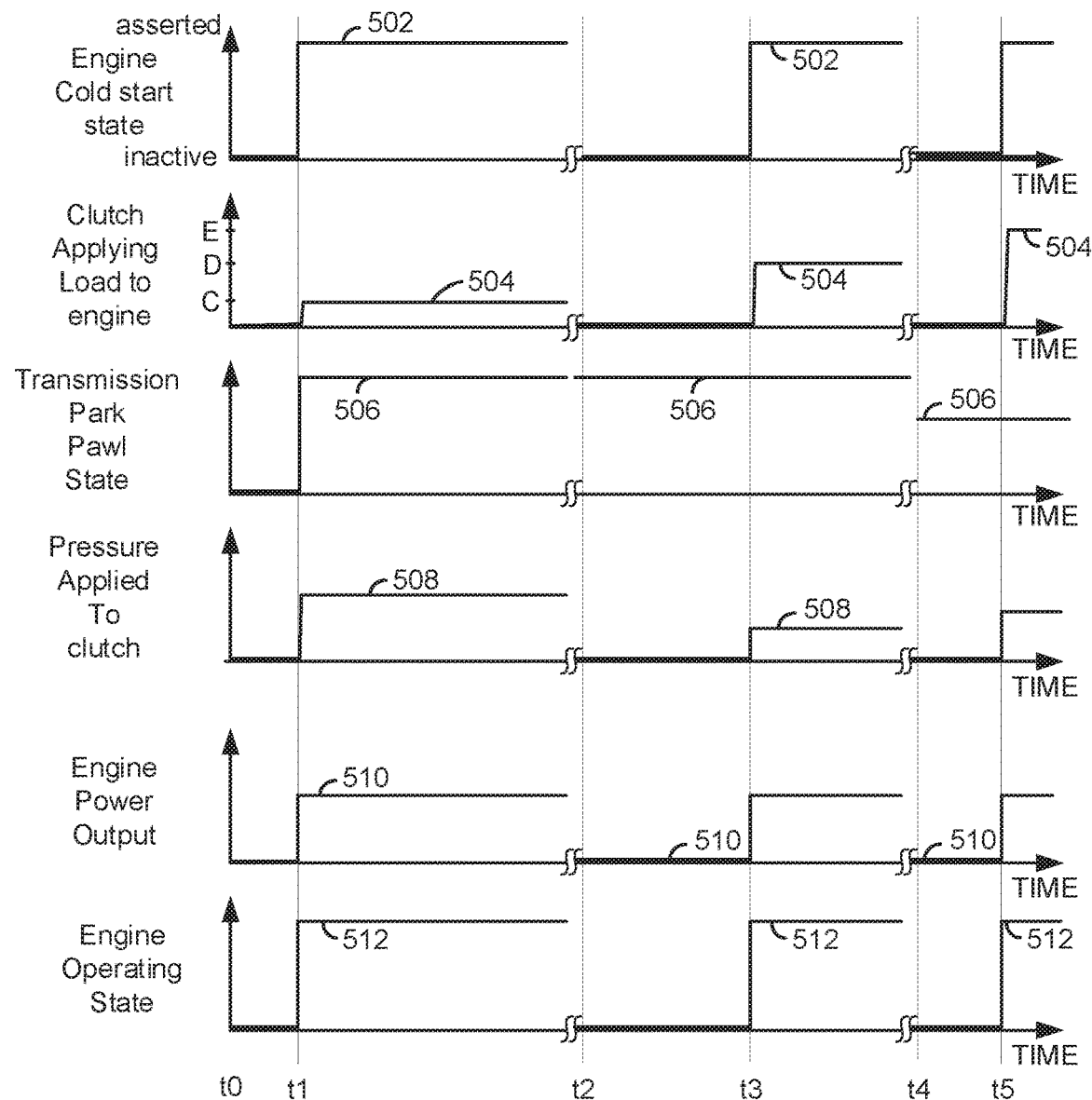
FIG. 5 shows several engine cold starts according to the method of FIG. 6.
Figure 6:
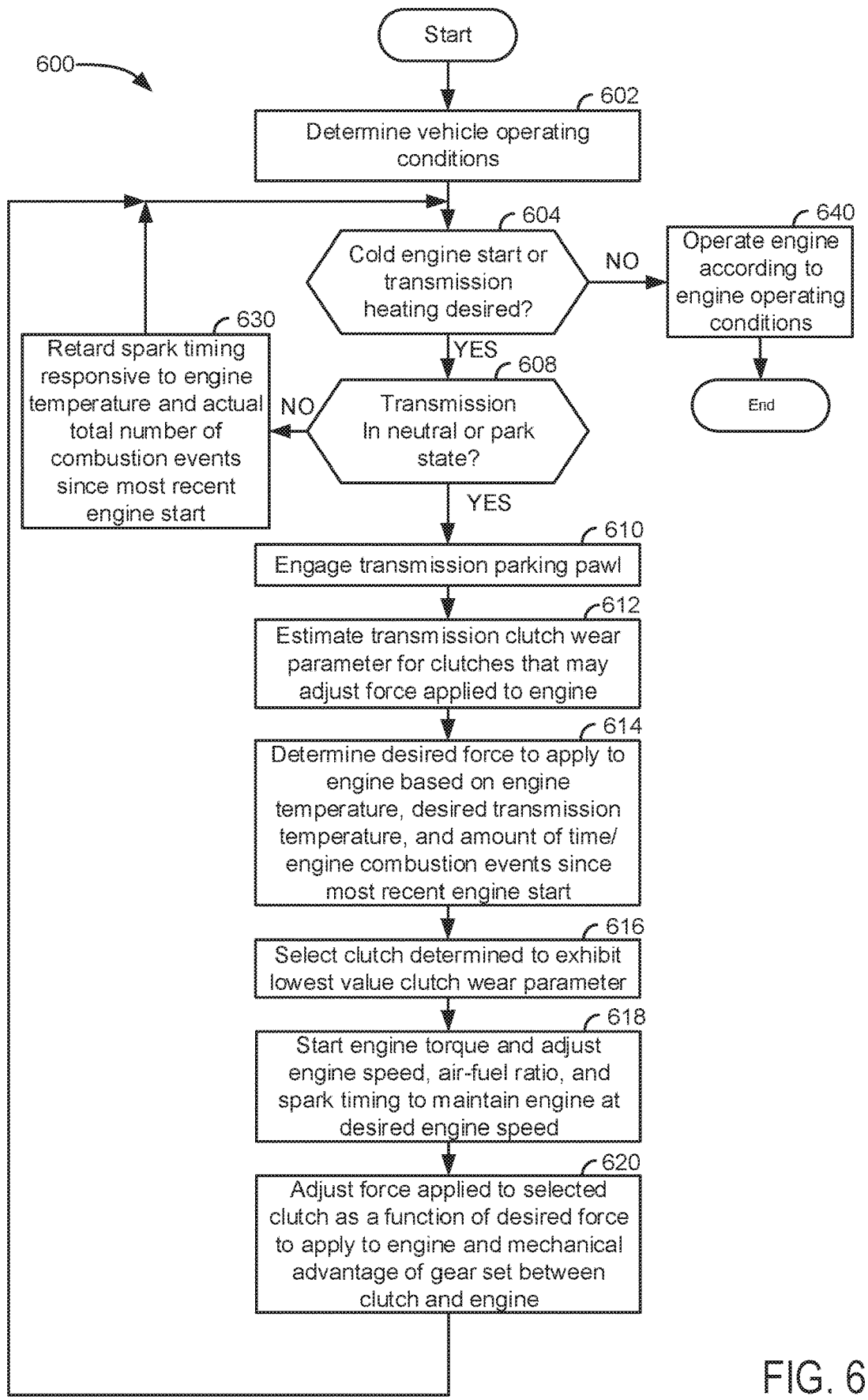
FIG. 6 shows an example method for operating an engine and transmission.

Referring now to FIG. 5, three prophetic engine cold starts according to the method of FIG. 6 are shown. The sequence of FIG. 5 may be provided according to the method of FIG. 5 in conjunction with the system of FIGS. 1-4. The plots shown in FIG. 5 occur at the same time and are aligned in time. The vertical lines at times t0-t5 represent times of interest in the sequence. The SS marks along the horizontal axis represent a break in time in the sequence and the break in time may be long or short.

The first plot from the top of FIG. 5 is a plot of engine cold start operating state versus time. The vertical axis represents the engine cold start operating state and the engine cold start is requested when trace 502 is at a higher level near the vertical axis arrow. The engine cold start is not requested when trace 502 is at a lower level near the horizontal axis. The horizontal axis represents time and time increases from the left side of the figure to the right side of the figure. Trace 502 represents the engine cold start state.

The second plot from the top of FIG. 5 is a plot of a transmission clutch applying load to an engine versus time. The vertical axis represents the clutch applying load to the engine and the clutches are identified by letters C-D-E. The horizontal axis represents time and time increases from the left side of the figure to the right side of the figure. Trace 504 represents the clutch that is applying a load to the engine.

The third plot from the top of FIG. 5 is a plot of transmission park pawl state versus time. The park pawl is engaged to stop transmission output shaft rotation when trace 506 is at a higher level near the vertical axis arrow. The parking pawl is disengaged to allow free rotation of the transmission output shaft when trace 506 is at a lower level near the horizontal axis. The horizontal axis represents time and time increases from the left side of the figure to the right side of the figure. Trace 506 represents the parking pawl operating state.

The fourth plot from the top of FIG. 5 is a plot of pressure that is applied to the transmission gear clutch that is being engaged versus time. The vertical axis represents the pressure that is applied to adjust clutch torque capacity and the pressure increases in the direction of the vertical axis arrow. The horizontal axis represents time and time increases from the left side of the figure to the right side of the figure. Trace 508 indicates the pressure that is applied to the clutch that is applying a load to the engine.

The fifth plot from the top of FIG. 5 is a plot of engine power output versus time. The vertical axis represents the engine power output and the engine power output increases in the direction of the vertical axis arrow. The horizontal axis represents time and time increases from the left side of the figure to the right side of the figure. Trace 510 represents the engine power output amount.

The sixth plot from the top of FIG. 5 is a plot of engine operating state versus time. The vertical axis represents the engine operating state and the engine is operating (e.g., rotating and combusting fuel) when trace 512 is at a higher level near the vertical axis arrow. The engine is not operating when trace 512 is near the horizontal axis. The horizontal axis represents time and time increases from the left side of the figure to the right side of the figure. Trace 512 represents the engine operating state.

At time t0, the engine is stopped and an engine cold start is not requested. No transmission clutch is applying a load to the engine and the transmission parking pawl is not engaged (e.g., the transmission is in neutral). The pressure that is applied to the transmission clutches is zero and engine power output is zero.

At time t1, a cold engine start is requested and the engine is started. Transmission clutch C begins to apply a load to the engine shortly after the engine is started at time t1. The pressure that is applied to clutch C is a higher middle level pressure since this pressure provides the load that is requested to be applied to the engine and since there is no mechanical advantage between clutch C and the engine. The torque converter clutch is fully locked (not shown) and the engine is operated in a speed control mode (e.g., the engine speed is controlled to a desired engine speed while engine torque is allowed to vary) (not shown) where engine power output is at a middle level.

Between time t1 and time t2, the engine is operated with spark timing that is retarded from minimum spark advance timing for best engine torque and energy is delivered to a catalyst to reduce catalyst light-off time (not shown). The engine sequence stops before time t2.

At time t2, the engine is stopped and an engine cold start is not requested. No transmission clutch is applying a load to the engine and the transmission parking pawl is not engaged (e.g., the transmission is in neutral). The pressure that is applied to the transmission clutches is zero and engine power output is zero.

At time t3, a cold engine start is requested and the engine is started. Transmission clutch D begins to apply a load to the engine shortly after the engine is started at time t3. The pressure that is applied to clutch D is a lower level pressure since this pressure provides the load that is requested to be applied to the engine (the same load as at time t1) and since there is mechanical advantage between clutch D and the engine. The torque converter clutch is fully locked (not shown) and the engine is operated in a speed control mode (e.g., the engine speed is controlled to a desired engine speed while engine torque is allowed to vary) (not shown) where engine power output is at a middle level.

Between time t3 and time t4, the engine is operated with spark timing that is retarded from minimum spark advance timing for best engine torque and energy is delivered to a catalyst to reduce catalyst light-off time (not shown). The engine sequence stops before time t4.

At time t4, the engine is stopped and an engine cold start is not requested. No transmission clutch is applying a load to the engine and the transmission parking pawl is not engaged (e.g., the transmission is in neutral). The pressure that is applied to the transmission clutches is zero and engine power output is zero.

At time t5, a cold engine start is requested and the engine is started. Transmission clutch E begins to apply a load to the engine shortly after the engine is started at time t5. The pressure that is applied to clutch E is a middle level pressure since this pressure provides the load that is requested to be applied to the engine (the same load as at time t1) and since there is mechanical advantage between clutch E and the engine. The torque converter clutch is fully locked (not shown) and the engine is operated in a speed control mode (e.g., the engine speed is controlled to a desired engine speed while engine torque is allowed to vary) (not shown) where engine power output is at a middle level.

After time t4, the engine is operated with spark timing that is retarded from minimum spark advance timing for best engine torque and energy is delivered to a catalyst to reduce catalyst light-off time (not shown).

In this way, the mechanical advantage provided by transmission planetary gear sets may be applied so that one clutch may apply higher loads to the engine or so that one clutch may apply an equal load to the engine while the clutch is operated with a lower torque capacity. Further, as elaborated in further detail in the description of method 600, operation of the clutches may be changed from engine cold start to engine cold start based in part on a clutch degradation metric, which may be a function of clutch torque capacity during engine cold starting.

Referring now to FIG. 6, a method for operating a vehicle is shown. At least portions of method 600 may be implemented as executable controller instructions stored in non-transitory memory. Additionally, portions of method 600 may be actions taken in the physical world to transform an operating state of an actuator or device. The method of FIG. 6 may be incorporated into the system of FIGS. 1 and 2 as executable instructions stored in non-transitory memory.

At 602, method 600 determines vehicle operating conditions. Vehicle operating conditions may include, but are not limited to transmission temperature, engine temperature, engine operating state, driver demand torque, transmission gear selector position, engine speed, engine load, and ambient temperature. Method 600 may determine values for these parameters via output of vehicle sensors. Method 600 proceeds to 604.

At 604, method 600 judges if an engine cold start is requested or if transmission heating is requested. An engine cold start may be requested in response to a human driver pressing a push to start button, moving an ignition key, or entering a proximity of a vehicle with a key fob while engine temperature (e.g., engine coolant temperature) is less than a threshold temperature (e.g., 20° C.). Transmission heating may be requested if transmission fluid temperature is less than a threshold temperature (e.g., 20° C.). If method 600 judges that an engine cold start is requested or in progress or transmission heating is requested, the answer is yes and method 600 proceeds to 608. Otherwise, the answer is no and method 600 proceeds to 640.

At 640, method 600 operates the engine according to engine operating conditions. For example, the engine may operate with spark timing that is at or close to minimum spark advance timing for best engine torque and with a stoichiometric air-fuel ratio during conditions when the engine is not being cold started or when transmission heating is not requested. Further, the transmission's torque converter clutch may be open or locked responsive to vehicle operating conditions. If the engine is operating at idle conditions, some spark retard may be applied to allow a torque reserve to compensate for conditions when an amount of torque that is applied to the engine increases unexpectedly. Method 600 proceeds to exit.

At 608, method 600 judges if a transmission is engaged in neutral or a park state. If so, the answer is yes and method 600 proceeds to 610. Otherwise, the answer is no and method 600 proceeds to 630.

At 630, method 600 retards engine spark timing as a function of engine temperature, catalyst temperature, and an actual number of engine combustion events (e.g., combustion of air and fuel in an engine cylinder) since a most recent engine start after an engine stop. Thus, method 600 may retard spark timing from minimum spark advance timing for best engine torque when a vehicle's transmission is engaged in reverse or drive to increase catalyst heating when the engine is being cold started and the transmission is engaged in a forward gear or reverse. The ignition timing may also be advanced as a function of engine load and speed so that a desired level of vehicle performance may be provided even when the engine is cold. Method 600 returns to 604.

At 610, method 600 engages the transmission parking pawl to lock the transmission output shaft if the parking pawl is not already engaged. Further, method 600 may lock the torque converter clutch so that engine torque may be delivered directly to the transmission input shaft and so that engine torque is not multiplied before it is transferred to the transmission input shaft. The torque converter clutch may be locked if the vehicle is on level ground. Alternatively, the torque converter clutch may be allowed to be completely open if multiplication of engine torque is desired. For example, the torque converter clutch may be fully open if the vehicle is on ground having a grade that is greater than a threshold grade incase the transmission is shifted into drive or reverse after the engine is started during cold conditions. Method 600 proceeds to 612.

At 612, method 600 optionally determines a degradation metric for each transmission clutch. In one example, the degradation metric may be expressed as:

$$ClutchA\_deg\_met = f(Pow\_app, Clutch\_close\_for, Clutch\_area)$$

where ClutchA_deg_met is a parameter that represents the clutch degradation metric value for clutch A, for example; f is a function that returns an estimate of clutch wear that occurs during an engine cold start procedure; Pow_app is a parameter that represents an amount of power that is applied to clutch A during the engine cold start procedure; Cluthc_close_for is a parameter that represents an amount of closing force that is applied to close clutch A; and Clutch_area is a parameter that represents the surface area of clutch A. The function f may reference empirically determined values in a table or equations. In other examples, the clutch degradation metric may be determined via alternative methods. Degradation metrics representing clutch degradation during an engine cold start for each engine cold start may be summed together to generate an overall or final degradation estimate for each transmission clutch. Method 600 proceeds to 614.

At 614, method 600 determines a desired load that is to be applied to the engine during and after the cold engine start or during transmission heating. In one example, the desired load may be determined via either one of the following equation:

$$CS\_des\_eng\_load = g(eng\_t, eng\_c\_evts)$$

$$TH\_des\_eng\_load = h(trans\_t, eng\_c\_evts)$$

where CS_des_eng_load is the engine cold start desired or requested engine load, g is a function that returns an engine load, eng_t represents an engine temperature that is applied to reference the function g, eng_c_events represents an actual total number of engine combustion events since a most recent engine start that is applied to reference the function g. The function g may reference empirically determined values in a table or equations. TH_des_eng_load is the transmission heating desired or requested engine load, h is a function that returns an engine load, trans_t represents a transmission temperature that is applied to reference the function h, eng_c_events represents an actual total number of engine combustion events since a most recent engine start that is applied to reference the function g. The function h may reference empirically determined values in a table or equations. Method 600 proceeds to 616.

At 616, method 600 selects a clutch that has a lowest value overall or final degradation metric for applying a load to the engine. By selecting the clutch with the lowest degradation level, the amount of degradation of each clutch may be level to the level of degradation of the other clutches. Alternatively, method 600 may randomly select a new clutch each engine cold start or each transmission heating event for applying load to the engine during and after the cold engine start. By selecting the clutch randomly among transmission clutches, the amount of degradation of each clutch may be level to the level of degradation of the other clutches. In still another example, method 600 may select a transmission clutch for applying load to the engine during and after a cold engine start responsive to road conditions so that if the transmission is disengaged from park into drive, the transmission may hold the vehicle on a grade. For example, if the vehicle is parked on a road having a grade that is greater than a threshold grade, then clutches A and B of the transmission may be locked and clutch C may be adjusted to provide a desired load to the engine. By making clutch C the clutch that supplies the load to the engine, it may be possible to ready the vehicle for engagement into first gear and to reduce the possibility of vehicle movement when the vehicle is on a road having a grade that is greater than a predetermined grade. During conditions where the vehicle is not on a road having a grade that is greater than a threshold grade, then clutch E or another clutch may be applied to adjust the load that is applied to the engine during and after the engine cold start.

Method 600 also selects one or more clutches of the transmission so that a desired mechanical advantage or gain is generated along the torque path between the engine and the clutch that is selected to apply a load to the engine. For example, clutches A and B of the transmission shown in FIG. 3 may be fully closed while clutch C, D, or E is partially closed (e.g., slip occurs across the clutch and the clutch torque capacity is adjusted to a desired level) to adjust the load that is applied to the engine via the transmission during and after the engine cold start. Method 600 proceeds 618.

At 618, method 600 starts the engine and operates the engine in a speed control mode (e.g., engine torque is adjusted and allowed to vary so that engine speed follows a requested or desired engine speed) at a desired idle speed for a cold start. Further, the engine is operated with a desired air-fuel ratio and spark timing that is retarded from minimum spark timing advance for best engine torque. For example, the engine may be operated with a lean (e.g., 15:1) air-fuel ratio and spark timing may be retarded by 15 crankshaft degrees. The lean air-fuel ratio may reduce engine hydrocarbon emissions and the retarded spark timing may increase the amount of heat that is delivered to the catalyst so that catalyst light-off time may be reduced. Method 600 proceeds to 620.

At 620, method 600 fully closes the selected one or more transmission clutches for generating a desired mechanical advantage between the clutch that is selected to apply the load to the engine and the engine. For example, method 600 may fully close clutches A and B of the transmission shown in FIG. 3. Method 600 also applies the requested or desired load that is determined at 614 via the clutch that was selected at 616 to apply the desired load to the engine. For example, the torque capacity of clutch C, D, or E of the transmission shown in FIG. 3 is adjusted to apply the load determined at 614 to the engine, including compensation for the mechanical advantage that may be provided via one or more planetary gear sets in the transmission. By applying the load to the engine, engine combustion stability may be improved and a greater mass flow rate of exhaust may be delivered to the catalyst to reduce catalyst light-off time and reduce vehicle emissions. In this example, clutch C, D, or E applies the load to the engine by coupling the engine to the vehicle chassis. Method 600 returns to 604.

Method of FIG. 6 provides for a vehicle operating method, comprising: locking two transmission clutches and adjusting a torque capacity of a third clutch via a controller in response to an engine cold start request; and starting an engine and retarding spark timing of the engine from a minimum spark timing for best engine torque spark timing via the controller in response to the engine cold start request. The method further comprises engaging a parking pawl in response to the engine cold start request. The method includes where the third clutch is a different clutch for each engine start. The method further comprises selecting the third clutch from a plurality of clutches in response to the engine cold start request. The method includes where the third clutch is selected based on a clutch degradation metric. The method includes where the third clutch is selected in response to a temperature. The method includes where the temperature is a temperature of the engine or a temperature of a transmission.

The method of FIG. 6 provides for a vehicle operating method, comprising: locking two transmission clutches and adjusting a torque capacity of a third clutch to a value that is a function of gear ratio of a planetary gear set and a desired load applied to an engine via a controller in response to an engine cold start request; and starting the engine via the controller in response to the engine cold start request. The method includes where the desired load applied to the engine is a function of engine temperature. The method includes where the desired load applied to the engine is a function of transmission temperature. The method includes where the desired load applied to the engine is a function of an actual total number of engine combustion events since a most recent engine start. The method includes where the third clutch is a different clutch for each engine start. The method further comprises selecting the third clutch from a plurality of clutches in response to the engine cold start request. The method further comprises retarding spark timing of the engine from minimum spark timing for best engine torque.

In another representation, the method of FIG. 6 provides for a vehicle operating method, comprising: locking at least one transmission clutch and adjusting a torque capacity of a third transmission clutch via a controller in response to an engine cold start request, the third transmission clutch selected from a plurality of transmission clutches; and starting an engine and retarding spark timing of the engine from a minimum spark timing for best engine torque spark timing via the controller in response to the engine cold start request. The method may include where the third transmission clutch is selected in response to a road grade. The method may include where the third transmission clutch is selected based on degradation of the plurality of clutches. Further, the load that is applied to the engine may be varied as a function of engine temperature. In one example, the engine load may be a threshold load at a predetermined temperature (e.g., 20° C.), and the engine load may be decreased as engine temperature at the time of engine cold start decreases.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
locking two transmission clutches and adjusting a torque capacity of a third transmission clutch via a controller in response to an engine cold start request; and starting an engine and retarding spark timing of the engine from a minimum spark timing for best engine torque spark timing via the controller in response to the engine cold start request.

2. The method of claim 1, further comprising engaging a parking pawl in response to the engine cold start request.

3. The method of claim 1, where the third transmission clutch is a different clutch for each engine start.

4. The method of claim 1, further comprising selecting the third transmission clutch from a plurality of clutches in response to the engine cold start request.

5. The method of claim 4, where the third transmission clutch is selected based on a clutch degradation metric.

6. The method of claim 4, where the third transmission clutch is selected in response to a temperature.

7. The method of claim 6, where the temperature is a temperature of the engine or a temperature of a transmission.

8. A vehicle operating method, comprising:
locking two transmission clutches and adjusting a torque capacity of a third transmission clutch to a value that is a function of gear ratio of a planetary gear set and a desired load applied to an engine via a controller in response to an engine cold start request; and
starting the engine via the controller in response to the engine cold start request.

9. The method of claim 8, where the desired load applied to the engine is a function of engine temperature.

10. The method of claim 8, where the desired load applied to the engine is a function of transmission temperature.

11. The method of claim 8, where the desired load applied to the engine is a function of an actual total number of engine combustion events since a most recent engine start.

12. The method of claim 8, where the third transmission clutch is a different clutch for each engine start.

13. The method of claim 8, further comprising selecting the third transmission clutch from a plurality of clutches in response to the engine cold start request.

14. The method of claim 8, further comprising retarding spark timing of the engine from minimum spark timing for best engine torque.

15. A system, comprising:
an engine;
an automatic transmission coupled to the engine; and
a controller including executable instructions stored in non-transitory memory to engage a parking pawl of the automatic transmission, fully close two clutches of the automatic transmission, and adjust a torque capacity of a third transmission clutch in response to a request to heat a fluid of the automatic transmission.

16. The system of claim 15, where the third transmission clutch is a different clutch for each engine start.

17. The system of claim 15, further comprising additional executable instructions to select the third transmission clutch in response to a clutch degradation metric.

18. The system of claim 15, further comprising additional executable instructions to select the third transmission clutch in response to a temperature.

19. The system of claim 18, where the temperature is an engine temperature or a transmission temperature.

20. The system of claim 19, further comprising additional executable instructions to select the third transmission clutch from a plurality of clutches.

* * * * *